United States Patent [19]
Steinhardt et al.

[11] Patent Number: 5,179,448
[45] Date of Patent: Jan. 12, 1993

[54] METHODS AND APPARATUS FOR ELIMINATING MOIRE' INTERFERENCE USING QUASIPERIODIC PATTERNS

[76] Inventors: Paul J. Steinhardt, 1000 Cedar Grove Rd., Wynnewood, Pa. 19096; Philip Taylor, 7801 Bustleton Ave., Philadelphia, Pa. 19152

[21] Appl. No.: 435,938

[22] Filed: Nov. 13, 1989

Related U.S. Application Data

[63] Continuation-in-part of Ser. No. 222,201, Jul. 21, 1988, Pat. No. 4,894,726.

[51] Int. Cl.⁵ ............... B41F 1/18; B41F 5/24; B41F 7/00
[52] U.S. Cl. ............... 358/298; 101/450.1; 101/463.1; 101/170; 101/401.1; 346/1.1
[58] Field of Search ............ 358/298, 454, 458, 459, 358/456; 283/93, 902; 101/401.1, 463.1, 170, 450.1

[56] References Cited

U.S. PATENT DOCUMENTS

| | | | |
|---|---|---|---|
| 4,566,042 | 1/1986 | Cahill | 358/298 |
| 4,894,726 | 1/1990 | Steinhardt | 358/298 |

*Primary Examiner*—Benjamin R. Fuller
*Assistant Examiner*—Scott A. Rogers
*Attorney, Agent, or Firm*—Woodcock Washburn Kurtz Mackiewicz & Norris

[57] ABSTRACT

Improved methods for reproducing an image are disclosed. Images are created using dots or patterns which are substantially quasiperiodic and thereby eliminate Moire' interference patterns. In multi-color applications, the disclosed methods simplify the color overlay process. Also disclosed are patterns for creating halftone images which do not exhibit Moire' interference patterns when overlaid. Electronic display apparatus using these patterns are also disclosed.

6 Claims, 4 Drawing Sheets

METHODS AND APPARATUS FOR ELIMINATING MOIRE' INTERFERENCE USING QUASIPERIODIC PATTERNS

This is a continuation-in-part of U.S. patent application Ser. No. 222,201, filed on Jul. 21, 1988, now U.S. Pat. No. 4,894,726.

This invention relates to the use of substantially quasiperiodic patterns in any of the printing, reproductive and graphic arts. Further, this invention is related to improved methods and apparatus for creating images using these patterns in printing processes such as photogravure, lithographic, flexographic, photoduplicative and other techniques. The patterns disclosed are also useful in cathode ray tubes and other electronic display devices.

BACKGROUND OF THE INVENTION

The reproduction of images by creating one or more half-tone images corresponding to one or more colors is a well-known technique; it is embodied in a variety of reproductive processes known to those of ordinary skill in the printing and graphic arts. The half-tone images are comprised of dot-patterns or other similar patterns. By overlaying the half-tone images, an accurate reproduction of the original image can be produced in large quantities. Printing processes such as photogravure, lithography and flexography all use such dot-pattern, half-tone images. Each half-tone image may be created photographically by superimposing a contact screen possessing such a dot-pattern on the original image. Other methods of obtaining half-tone images, such as those employing computer-controlled optical or laser devices which do not use screens, are also known within the art. The displays of cathode ray, liquid crystal display and other electronic devices also create a reproduction of an image by displaying a dot-pattern representation. These dots are usually known as pixels.

One method of printing, commonly known as gravure printing, is generally accomplished using plates containing fine recesses which hold ink or dye. Images may be reproduced in multiple colors by using a color separation process involving multiple half-tone images. By creating several half-tone copies of an original, continuous-tone image, the primary colors may be separated by photographic or other techniques and converted into several dot-pattern images. Thus, a continuous tone image is converted into several half-tone images with a high density of dots, typically 133 dots per inch. The resulting half-tone images may then be overlaid to reproduce the original image.

One technique for creating the half-tone color separations involves placing a dot-pattern screen on photographic film and making a contact negative of the continuous tone image. Alternatively, computer-controlled lasers may be employed to create the negative without employing a screen. Each dot-pattern negative is then used to print a half-tone image containing a different color. By overlaying dot-pattern images of different colors, a color image approximating the original continuous tone image results.

Half-tone images may also be created using computer-controlled scanners which utilize either an optical beam or a laser to impart a dot-pattern onto a photographic plate or similar means. A laser device can also be used to incise a dot-pattern directly upon a photogravure plate, which may either be flat or cylindrical. These processes do not utilize screens, but nonetheless require the original image to be converted into one or more dot-pattern half-tone images in order for reproductions to be made.

The screen of a cathode ray tube contains discrete dots or line segments which are selectively activated to reproduce an image. Similarly, liquid crystal displays contain elements which are activated electronically to create a reproduction of an image which is composed of a dot-pattern, in the manner of a half-tone image. Other types of displays operate in a manner which also utilizes the technique of breaking an image into a discrete pattern of activated and inactivated dots or line segments to create a reproduction.

Those of ordinary skill in the art will understand that the term "dot-patterns" generally encompasses both positive and negative patterns. The "dot-patterns" used in a reproduction process may be comprised of dots, line segments or other discrete areas which are to be substantially filled with color along with other discrete areas substantially free from the color being printed. The term "printing," as related to the present invention, is recognized as a broad term, generally describing those reproduction processes used in the graphic arts to transfer an image to an object. The term "printing" is therefore meant to include techniques such as gravure printing, lithography, flexography, photoduplication and any and all techniques which reduce an image to discrete areas of color (i.e., dot-patterns) commonly known as a half-tone images. It is further generally understood that "printing" encompasses using one or more colors. For example, in four color reproduction, the most common are the three primary colors (magenta, cyan, and yellow) and black. Therefore, numerous combinations of printing methods, dot-patterns and color combinations exist. All of these however, share the common element of reproducing a continuous tone original image by creating one or more dot-pattern half-tone color separations. In these processes, both shading and hue are governed by the arrangement and density of the discrete areas arrayed to form the dot-pattern.

In order for the any of above-described techniques to be successful, the dots of different colors should be separated. Failure to provide this separation will result in distortion caused by the different color inks or dyes running together. One manner in which the necessary separation has previously been accomplished is by using screens which consist of lines or dots that are periodically spaced. By rotating these screens with respect to one another, e.g., by about thirty degrees, dots of different colors are reproduced which are sufficiently separated to reduce color distortion.

It is known to those skilled in the art, however, that overlaying periodic dot patterns will generally produce a Moire' interference pattern. These patterns are caused by an optical effect (Moire' effect) which occurs when one or more periodic patterns are superimposed upon each other, but rotated by a finite angle such that the patterns cross at angles to produce a periodic pattern of interference lines, whose spacing varies with the angle of rotation. The optical effect thereby induced causes a new family of curves to appear which passes through the intersections of the original patterns. As applied to the dense dot patterns of multi-color printing, the Moire' effect produces an objectionable interference pattern (e.g., checkerboard, rosettes, wavy lines, etc.) which can destroy the effect of an image by distorting the perception of the texture, color and detail in the finished work. Moire' patterns even occur in flat screen tints which use one or more colors of ink to produce other color values. Interference patterns also appear on images created using cathode ray tubes and other types of electronic displays. The image displayed, for example a television picture or computer graphics, is composed of individual elements, or pixels, arrayed substantially in a periodic pattern. For this reason, Moire' and similar interference patterns appear and degrade the quality of the reproduction.

One partial solution to the problem of Moire' interference patterns in the graphic arts has been to register the different dot-pattern screens at precise, empirically determined angles with respect to one another. Even if done correctly, this technique will not eliminate the Moire' patterns, but merely cause the spacing between the Moire' lines to be greater than the dimensions of the image. This is obviously a severe practical limitation on the use of registration as a means of reducing the Moire' effect. Additionally, this technique is exceedingly difficult to accomplish when printing on paper, metal or plastic, and is essentially impossible when printing on textiles, due to the inherent irregularities in the material.

Others have recognized and attempted to provide a solution to this problem. For example, U.S. Pat. No. 4,553,215—Masuda et al., attempts to solve the problem by displacing the sides of periodic screens in an irregular manner to produce irregularly varied shapes, or irregular sets of points corresponding to the vertices of these irregular shapes. The patterns of Masuda et al. begin with a pattern of one of the three known, regular, space-filling polygons, (the regular triangle, the regular quadrilateral, and the regular hexagon), to which some irregular deformation is imparted. Because the deformations are obtained by bounded deviations from a periodic pattern, the Moire' interference pattern may only be reduced, not completely eliminated. It is well known that unbounded randomness will produce undesirable fluctuations in dot density, thereby creating a less-than-optimal printed image.

As a variation on the concept of Masuda et al., non-periodic deviations, such as those known in quasiperiodic systems theory, might be considered. However, in this case, such patterns retain a crystallographic (i.e., square, rectangular, triangular or rhombic) orientational symmetry. Again, as with Masuda et al., since the translations from periodicity are bounded, the Moire' effect cannot be completely eliminated. This technique, as well as that disclosed by Masuda et al., further suffers from the disadvantage of creating an almost infinite number of fundamental elements which define the resulting dot-pattern. Preferably, two or three fundamental elements should be defined which may be arrayed to produce a dot-pattern which eliminates Moire' interference.

The use of irrational numbers to generate dot-patterns has been disclosed in U.S. Pat. No. 3,997,911—Perriman et al. However, the irrational numbers are not used to produce a quasiperiodic pattern. Instead, irrational numbers are used as part of an efficient algorithm used to rotate a periodic patterns so as to produce a new periodic pattern, where the tangent of the angle of rotation between the patterns is irrational. Since the resulting pattern is periodic, superimposing this pattern over the original periodic pattern produces the Moire' effect. Rather than eliminating the Moire' interference pattern, the goal of Perriman et al. is to apply irrational numbers in an automated procedure to rapidly obtain from an original image a sequence of periodic patterns at optimal registry angles. In other words, this technique implements the traditional registry approach whereby although a Moire' pattern is produced, the angles between the periodic patterns are adjusted such that the wavelength of the Moire' interference is large relative to the image.

From these examples, it can be seen that prior attempts to eliminate Moire' interference patterns have not been entirely successful. Instead, those skilled in the art have had to be content with minimizing the Moire' effect by utilizing complex deviations from periodic patterns or by careful registry—with a resultant trade off in image quality as a result. Hence, there remains a long-felt and unfulfilled need for a generalized and simplified technique which may be used to generate half-tone color separations which will render accurate dot-pattern images and eliminate the undesirable Moire' effect.

OBJECTS OF THE INVENTION

It is an object of the present invention to provide patterns for use in the printing and graphic arts which eliminate the occurrence of Moire' interference patterns.

It is another object of the present invention to provide patterns to generate half-tones or screened images which may be overlaid upon one another to form an image without regard to the relative angular orientation of the patterns.

It is yet another object of this invention to provide patterns which may be imparted directly upon photographic means, printing plates or other devices capable of recording such patterns and causing them to reproduce an original image.

A still further object of the present invention is to provide patterns which may be imparted onto photographic or printing plate means by a computer controlled laser scanning apparatus.

Another object of the present invention is to provide methods for creating reproductions of an image which do not exhibit Moire' interference patterns.

It is another object of the present invention to provide methods of creating multiple color images which do not require the registry of the angular relationship among half-tone images used for the successive overlaying of a plurality of colors.

A further object of the present invention is to allow rescreening for reprinting an image which had been printed with a periodic pattern, without introducing the Moire' interference pattern which would normally occur.

It is an object of this invention to provide patterns for use in cathode ray tube, liquid crystal display and other electronic display devices which eliminate the occurrence of Moire' or other interference patterns.

SUMMARY OF THE INVENTION

It has now been discovered that Moire' interference patterns can be substantially eliminated when reproducing an image by converting the original image into at least one half-tone image, the dot-pattern of the half-tone image arrayed substantially in accordance with a quasiperiodic pattern. The methods of the present invention may also be applied repetitively to reproduce multicolor images. A plurality of half-tone images are created, each having a different quasiperiodic dot-pattern. These half-tone images are then overlaid to reproduce a multicolor image. The methods of the present invention can be used to print on paper, metal, plastic, textiles or any object.

The present invention also discloses apparatus, such as half-tone screens, which utilize the quasiperiodic patterns disclosed. The quasiperiodic patterns disclosed may also be programmed directly into computer-controlled scanning devices and laser printing apparatus, which convert images to half-tones without the use of screens.

Images created using periodic half tone screens can be rescreened using the methods and apparatus of the present invention to provide an improved image and substantially eliminate the existing Moire' interference pattern.

The quasiperiodic patterns disclosed are also useful for eliminating interference patterns which occur in electronic display apparatus, such as cathode ray tubes and liquid crystal displays. These apparatus, as well as other types of displays, convert an image into a discrete pattern, similar to a half-tone, and display the converted image by the selective excitation of discrete elements. By arraying these elements substantially in accordance with the quasiperiodic patterns disclosed, interference patterns can be substantially eliminated.

In quasiperiodic patterns, there are at least two different distances between elements (e.g., dots); the ratio of the distances and the ratio of the frequencies with which the repeat. In a preferred embodiment, two different quasiperiodic patterns with different irrational ratios are chosen. A spectrum of other symmetries and patterns are known and can be produced using the methods of the present invention. The specific patterns disclosed are by way of example only and represent a small portion of this spectrum.

Also, patterns useful for reducing Moire' which comprise randomly spaced lines are disclosed. It has also been found that in certain embodiments nearly quasiperiodic patterns with a period much larger than the size of the pattern elements also substantially reduce Moire' interference patterns.

Further objects and advantages of the present invention will be apparent from the following description, reference being made to the accompanying drawings wherein certain embodiments of the present invention are clearly shown.

DETAILED DESCRIPTION OF THE PREFERRED EMBODIMENTS

Figure 3:
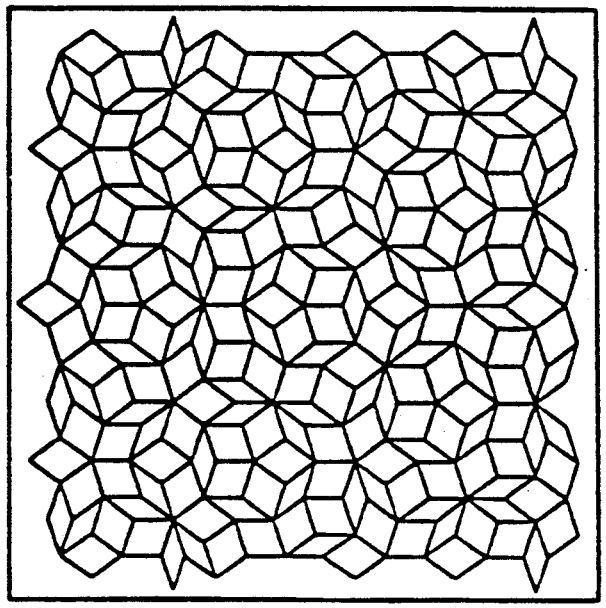
FIG. 3 shows a portion of a quasiperiodic pattern possessing five-fold orientational symmetry comprised of the rhombus shapes of FIG. 2.

The methods of the present invention use the properties of quasiperiodic shapes, tilings, or a sequence of lines to create a dot pattern of sufficient density to accurately reproduce the detail of an image, without the occurrence of Moire' interference patterns. Quasiperiodic patterns are ordered patterns, consisting of a plurality of elements packed in an arrangement. The intervals between elements and the frequencies with which the element appears have ratios which are irrational, i.e., the ratios cannot be expressed as the ratios of two whole numbers. By overlaying one or more quasiperiodic patterns, the Moire' interference patterns which might otherwise occur can be substantially eliminated.

One embodiment of the present invention utilizes the unique properties of the quadrilateral shapes, or tilings, first disclosed by U.S. Pat. No. 4,133,152—Penrose, (incorporated herein by reference) which are quasiperiodic in nature. However, developments in the field of tessellation have shown that an infinite number of distinct quasiperiodic tilings exist. Periodic space-filling tilings are known which consist of regular triangles, quadrilaterals, or hexagons arrayed in a pattern repeated at regular intervals, resulting in periodic patterns which cause the Moire' effect. By contrast, a quasiperiodic pattern is non-periodic; the lattice distance is described by an irrational number. However, quasiperiodic patterns possess a form of symmetry and cover a surface completely, without gaps or irregular discontinuities. For example, a set of tiles consisting of two rhombus shapes can be constructed which, when arranged in a pattern, possess the five-fold orientational symmetry of a pentagon but completely fill a surface—unlike a pattern of pentagons.

A method of generating quasiperiodic tilings in which the tile edges can be constrained to lie along any finite set of directions can be found in Socolar et al., "Quasicrystals with arbitrary orientational symmetry", Journal of the American Physical Society, Vol. 32, No. 8, p. 5547 (Oct. 15, 1985) (which is incorporated herein by reference). The finite set of directions can be distributed symmetrically (e.g. the five-fold, seven-fold or nine-fold patterns discussed above) or asymmetrically. Those patterns which cannot be described by N-dimensional orientational symmetries (e.g., 2-fold, 3-fold, 4-fold, 5-fold, etc.) are described as possessing non-crystallographic orientational symmetry. The set of directions define the "orientational symmetry" of the lattice. Except for special cases, two quasiperiodic patterns with different orientational symmetries have different tile shapes and the frequency with which each shape appears is different; the ratios of the frequencies and the dimensions for different patterns are in fact related by an irrational number. This irrational relation guarantees that overlaying one or more quasiperiodic patterns with different orientational symmetries does not produce a Moire' interference pattern.

Several considerations must be taken into account to choose the patterns which will be overlaid. The methods and apparatus of the present invention allow three degrees of freedom to be adjusted: (1) the number of orientation directions; (2) the relative angles between the orientation directions; and (3) the frequencies with which the different tile shapes are repeated. One or more patterns which differ in any one of these three aspects will not produce a Moire' interference pattern when overlaid. Additionally, two other degrees of freedom are considered when producing a final dot-pattern: (1) the arrangement of the tiles, (i.e., within a given symmetry fixed by tile shapes and frequencies there are still many distinct tile arrangements); (2) the arrangement of dots generated by or applied to each tile-type. Two tiles which differ only in these two degrees of freedom may produce a Moire' interference pattern, however, these degrees of freedom are nevertheless useful in selecting optimal dot patterns and densities for a given application.

It has now been demonstrated that quasiperiodic patterns with irrational periodicities do not form Moire' patterns. Further, overlaying quasiperiodic patterns with a high degree of symmetry and many incommensurate periodicities does not produce the undesirable Moire' interference pattern. The quasiperiodic patterns of the present invention may consist of varied shapes such as rhombus shapes, line segments or, preferably, dots.

Another method of generating quasiperiodic patterns, directly related to the rhombus patterns described above, can be described as a quasiperiodic "grid" pattern comprised of sets of straight, parallel lines extending across an entire pattern. Each set of parallel lines is oriented perpendicular to an orientational symmetry direction. A quasiperiodic grid pattern with N-fold symmetry consists of sets of parallel lines, the N'th set of which is oriented at an angle of 2 (m−1)/N radians with respect to the first set of parallel lines. However, the intervals between the parallel lines are not equal. In general, there are two or more intervals which repeat according to a quasiperiodic sequence. The quasiperiodicity of the sequence is necessary to ensure that, when the sets of parallel lines are superimposed, only a finite number of polygons are produced by the crossed sets of lines. By contrast, if the intervals between the parallel lines were all equal, overlapping the lines would produce an infinite number of polygons, including polygons of arbitrarily small size. Since dots have a finite size, placing dots in the corners of polygons of arbitrarily small size would result in an undesirable overlap of dots. Quasiperiodic grid patterns such as those described can be obtained from quasiperiodic rhombus patterns and vice versa.

The formation of quasiperiodic patterns in this manner may be characterized as a "generalized dual method" for constructing quasiperiodic patterns of rhombuses. The first step in this procedure, as set forth above, involves choosing N star vectors which define the orientation symmetry of the pattern and the shapes of the rhombuses. The second step is to overlay N grids of parallel lines. A rhombus shape can be associated with each type of intersection among lines, i.e., depending on the relative angle and orientation of the lines. The "dual" procedure naps the grid pattern into a pattern of rhombuses from which a complete tiling of the space results. It has now been found, however, that in addition to the case of patterns derived from grids of periodically or quasiperiodically spaced lines which exhibit "perfect" quasiperiodicity, that useful patterns can be achieved by using randomly spaced parallel lines is still basically quasiperiodic. The sines or cosines of the angles of intersection among the grid lines still have irrational ratios. Hence, average properties of the pattern, e.g., ratio of the numbers of tiles of given types, are still irrational, and there is an average quasiperiodicity. However, a randomization is also introduced into the pattern. Such patterns are highly useful for developing screens for a variety of printing applications in an attempt to reduce or eliminate Moire' patterns. For example, it has been found that the rosette patterns of rhombuses that appear in the five-fold pattern are suppressed by introducing randomly spaced lines. This is desirable for the printing of dot patterns.

In one embodiment, the present invention provides screens for use in printing, upon which a quasiperiodic pattern has been imparted. Such screens may be made from any suitable material and may be used with any method of printing, such as photographic or computer-controlled laser techniques known within the art. Depending upon the technique used, this pattern will usually be a gradient which is substantially opaque or photoresistive. When the screen is disposed between a continuous tone image and the photographic film or similar means used by the printer, a quasiperiodic pattern half-tone image will result. Alternatively, the quasiperiodic patterns disclosed may be imparted directly to photographic film by an optical device or laser. Also, quasiperiodic patterns may be incised into a photogravure plate by a laser device without the use of photographic film.

Using well-known techniques, half-tone images can be created for each primary color which exists in the continuous tone original. The resulting set of half-tone images can then be combined to create a reproduction of an image. Those skilled in the art realize that each primary color must be printed with the half-tone dot pattern to which it corresponds. An advantage of the present invention is that each successive printing of a primary color may be overlaid upon another without regard to their angular relationship, unlike the registry techniques previously described. Therefore, the present invention both simplifies the reproduction process and eliminates the Moire' interference patterns which plague those in the graphic arts.

It will also be realized by those skilled in the art that the methods and apparatus of the present invention are generally applicable to any process which involves the conversion of a substantially continuous tone image to an image composed of a pattern of shapes, whether for color separation or other reasons. Although the present invention is directed to quasiperiodic patterns, it will be understood that the term quasiperiodic in fact encompasses patterns which are substantially quasiperiodic or which exhibit a large-scale periodicity. Numerous printed items such as textiles, wall coverings, wrapping paper and the like are produced by continuous methods which involve large rolls of such materials. The substantially quasiperiodic patterns disclosed herein are particularly useful for designs on objects such as textiles. These patterns are aesthetically attractive and can be produced by a computer, therefore lending themselves to a production process. However, in such an application, the pattern cannot be "perfectly" quasiperiodic. The patterns must be printed using large rollers and, hence, any pattern must necessarily be periodic in at least one direction, with a period equal to the circumference of the roller. The requirement of this type of process therefore is a "nearly" quasiperiodic pattern—a pattern of rhombuses that looks identical to the perfect pattern when a small cluster of rhombuses is examined, but is actually periodic with a period much larger than the size of the elements which comprise the pattern.

To produce such a pattern, instead of beginning with an "ideal" set of N star vectors which are distributed symmetrically about a circle, one can use a slightly "distorted set" in which the vectors are not distributed symmetrically. As set forth above, it is possible to generate patterns in accordance with the present invention by the use of sets of parallel, intersecting "grid" lines. In order to generate a "nearly" quasiperiodic pattern instead of using an "ideal set" of N star vectors which are distributed symmetrically about a circle, one can use a slightly "distorted" set in which the vectors are not distributed symmetrically. Whereas the sines (or cosines) of the angles of the grid-line intersections have irrational ratios for the ideal set, we can choose the distorted set so that the ratios are rational, insuring that the pattern will be periodic. The closer the rational ratios of the distorted set are to the irrational ratios of the ideal set, the longer the period of the pattern will be. Thus, in two-dimensional patterns, the periods may be fixed to be different in two orthogonal directions by changing the ratios of sines in a different way from the ratios of cosines compared to the original ideal set of N star vectors. In fact, one direction can be chosen to be periodic and the other to be quasiperiodic. This technique is sufficient, and may in certain applications ideal, for solving the problem of producing nearly quasiperiodic patterns for roller production, such as that found in the textile and paper printing industries.

As will be readily understood by one of ordinary skill there are many variations of this procedure. For example, there are numerous variations of the rhombus shapes which can be experimented with. If the standard dual procedure described above is followed, then slightly distorted sets of star vectors will result in slightly distorted sets of rhombus shapes. However, there is a variant of the procedure in which the star vectors used to generate the grid-lines can be different from the start vectors used to generate the rhombus/tile pattern elements. The distorted star vectors can be used to generate the grid pattern, guaranteeing that the pattern is therefore periodic, but the original, symmetrical star vectors can be used to generate the rhombuses themselves. In this case, the rhombuses or tiles are not distorted; they are identical to the rhombuses that appear in the ideal pattern. The methods and apparatus disclosed will eliminate Moire' interference patterns when used in any reproduction technique where the image conversion described is employed.

Those skilled in the art will further appreciate that the methods and apparatus of the present invention can be used to re-screen existing images created using periodic patterns. This process produces a different dot-pattern and dot density, without introducing a Moire' interference pattern within the original periodic pattern. Images processed in this manner will exhibit improved reproduction quality and the elimination of the undesirable Moire' interference patterns. Thus, images which have been previously printed using periodic patterns can be reprinted and benefit from the improvements provided by the present invention. By using the methods and apparatus disclosed, clarity and texture heretofore unattainable can be achieved without the introduction of a Moire' interference pattern.

The patterns disclosed by the present invention are also useful in the array of elements which are used to create cathode ray tubes, liquid crystal displays or other types of electronic displays. When an image is recreated by such a device, Moire' or other interference patterns occur if the image possesses a pattern which crosses the periodic arrangement of the array of elements (i.e., the "grain" of the elements) at an oblique angle. These effects can be substantially reduced by incorporating the patterns disclosed by the present invention into the element array.

Figure 2:
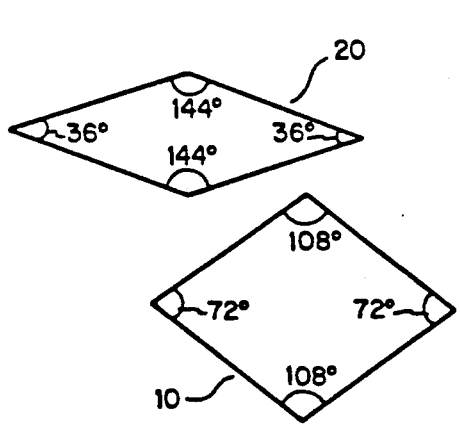
FIG. 2 illustrates a set of two rhombus shapes which may be used to construct a quasiperiodic pattern possessing five-fold orientational symmetry.
Figure 1:
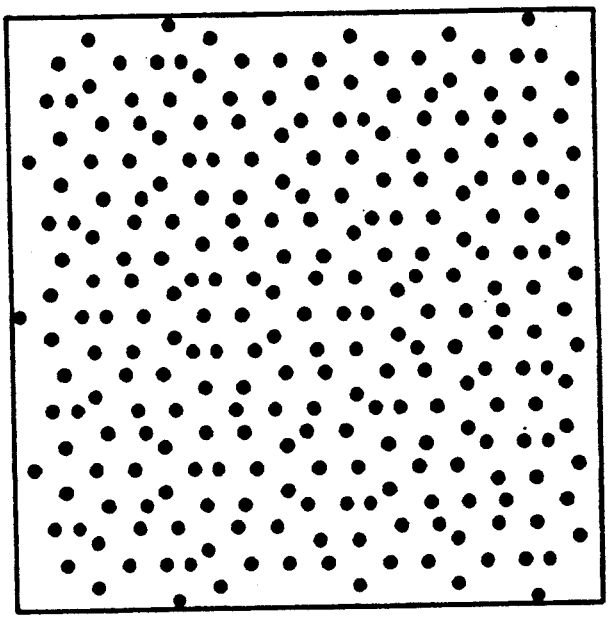
FIG. 1 is an illustration of a portion of a quasiperiodic dot-pattern possessing five-fold orientational symmetry.

In a first preferred embodiment, as illustrated in FIG. 1, the quasiperiodic dot-pattern is created by the intersections of the edges of a pattern comprised of rhombus shapes corresponding to five-fold symmetrical (Penrose) tiling, as illustrated in FIG. 2. These rhombus shapes have equal sides and comprise two distinct shapes. A first shape 10 has interior angles of 72° and 108°, and a second shape 20 has interior angles of 36° and 144°. When arranged to fill a planar surface, such as a contact screen or other printing apparatus, these shapes exhibit five-fold orientational symmetry and form a quasiperiodic pattern as illustrated in FIG. 3. It will be understood that other rhombus shapes and other sets of shapes in general may be used to create patterns of five-fold or other degrees of orientational symmetry.

Figure 5:
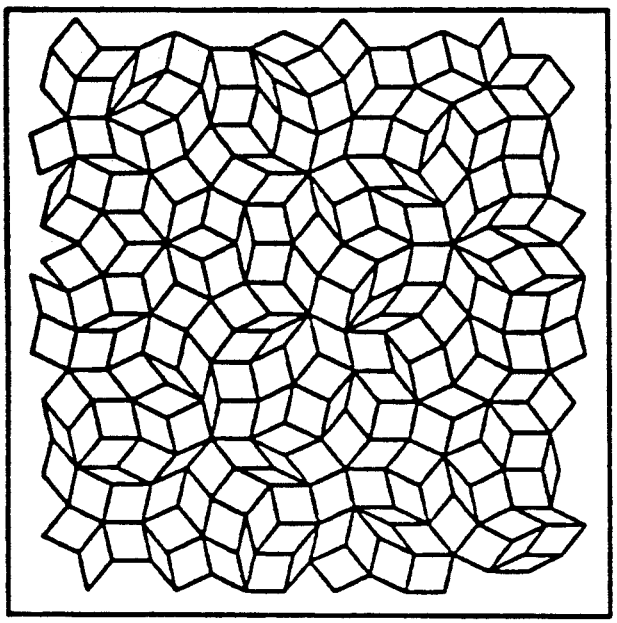
FIG. 5 illustrates a portion of a quasiperiodic pattern comprised of a set of two rhombus shapes which possesses seven-fold orientational symmetry.
Figure 4:
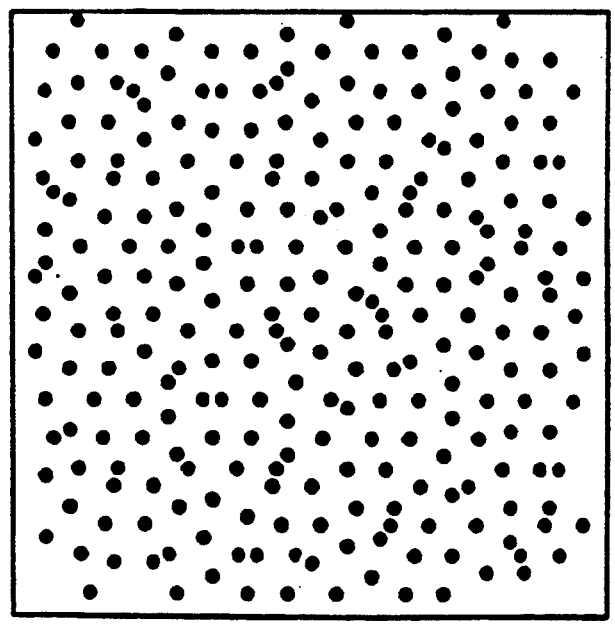
FIG. 4 is an illustration of a portion of a quasiperiodic dot-pattern possessing seven-fold orientational symmetry.

In another preferred embodiment, as illustrated in FIG. 4, the quasiperiodic dot pattern created possesses seven-fold orientational symmetry. This pattern results from the intersections of the edges of two rhombus shapes which were used to generate the quasiperiodic pattern illustrated in FIG. 5. The interior angles of these rhombus shapes, as well as other shapes possessing the same or different degrees of orientational symmetry, may be generated by the generalized method disclosed in Socolar et al., "Quasicrystals with arbitrary orientational symmetry", described above.

Figure 7:
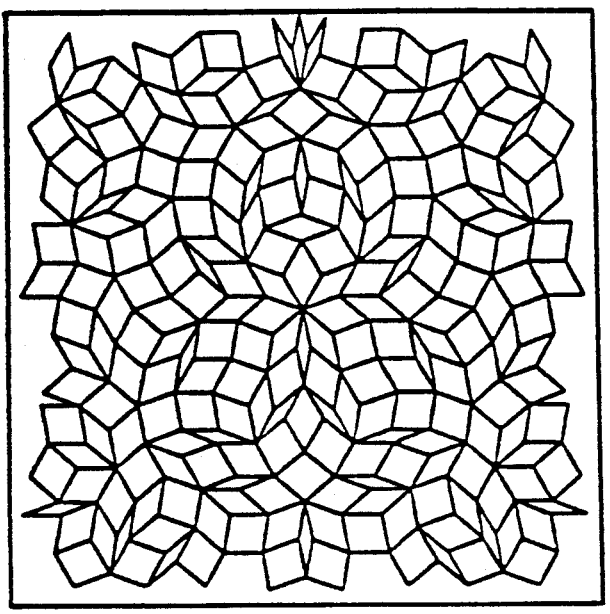
FIG. 7 illustrates a portion of a quasiperiodic pattern comprised of a set of two rhombus shapes which possesses nine-fold orientational symmetry.
Figure 6:
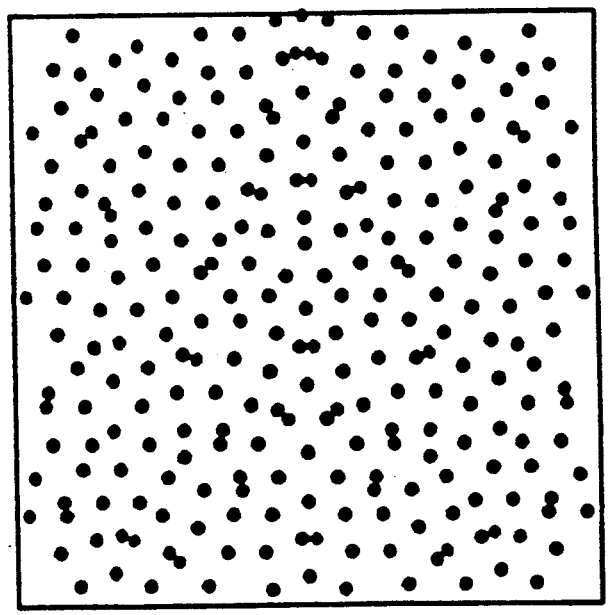
FIG. 6 is an illustration of a portion of a quasiperiodic dot-pattern possessing nine-fold orientational symmetry.

Another preferred embodiment of dot patterns is illustrated in FIG. 6 and is derived from the pattern of rhombus shapes shown in FIG. 7. This embodiment possesses nine-fold orientational symmetry.

Figure 8:
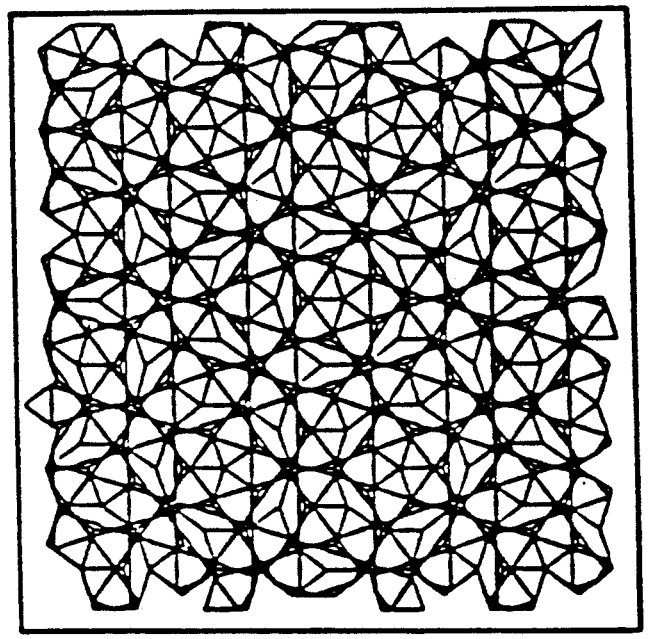
FIG. 8 depicts a pattern of five crossed sets of quasiperiodically spaced parallel lines. The intersections of these lines comprise a quasiperiodic grid pattern. The grid pattern is superimposed on the quasiperiodic pattern of FIG. 3.
Figure 9:
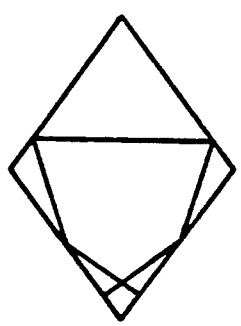
FIG. 9 and FIG. 10 illustrate the two rhombus shapes of FIG. 2, decorated with line segments. This segments join to form the pattern illustrated by FIG. 8 when assemble to cover a surface in a manner similar to that of FIG. 3.
Figure 10:
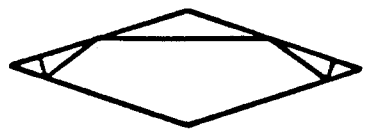

The quasiperiodic grid patterns comprised of sets of parallel lines, as discussed above, are illustrated in FIG. 8. In FIG. 8, a five-fold symmetric quasiperiodic grid pattern is shown superimposed upon a five-fold quasiperiodic rhombus pattern, made substantially in accordance with the pattern shown in FIG. 3. For a given quasiperiodic rhombus pattern, a grid pattern may be obtained by decorating each of the rhombus types with line segments, as shown in FIG. 9 and FIG. 10. These line segments form the continuous straight line segments of the grid pattern when the rhombus shapes are assembled to cover a surface. The lines delineating the rhombus shapes can now be erased of covered over, leaving only the quasiperiodic grid pattern of straight lines. A generalized procedure for constructing quasiperiodic grid patterns is described in D. Levine and P. J. Steinhardt, Physical Review, B34, 596 (1986).

A disadvantage of the quasiperiodic grid patterns described is that they possess a larger number of types of polygons than the rhombus patterns disclosed by the present invention. This may result in undesirable nonuniformities in dot-density on a microscopic scale. However, an advantage of the grid patterns disclosed is that they consist of substantially straight lines. Therefore, a raster-type scanner can more easily construct a dot-pattern in which the dots lie at the intersections of the straight lines than if the dots were placed at the corners of rhombuses. Hence, this form of quasiperiodic pattern will be preferred in some applications of the present invention.

These patterns, and other patterns with differing degrees of orientational symmetry, may be overlaid to eliminate Moire' interference patterns. The successive overlays may be made without regard to the angular registry of the patterns to each other.

It will be realized by one of ordinary skill in the art that additional patterns beyond those described in the examples and illustrated by the Figures are also useful. For example, the dot patterns used in the examples are obtained by placing dots only at the corners or intersections of the tiling edges. Other dot patterns exhibiting the same feature of eliminating Moire' interference patterns can be obtained by replacing each rhombus-shaped tile with a plurality of dots, lines or other geometric shapes. An array of such a plurality of such rhombus-shaped subsets of shapes exhibits the features of the present invention and possesses a higher dot density.

One skilled in the art will also appreciate that patterns duplicating the edges of the rhombus shapes themselves will also be useful in some applications. Further, it will be appreciated that patterns formed by leaving substantially transparent shapes such as lines or dots, will also lend themselves to certain applications. As further appreciated by those of ordinary skill, computer controlled lasers may be used to impart quasiperiodic patterns upon either photographic means or upon photogravure drums or plates directly, without transmission through a screen. Finally, those skilled in the art will realize that the quasiperiodic nature of the patterns described is in no way limited to the rhombus shapes or degrees of orientational symmetry which have been set out with particularity. Also as noted above patterns which are not perfectly quasiperiodic are also useful, such as the patterns described which are printed using large rollers and, hence, must necessarily be periodic in at least one direction with a period equal to the circumference of the roller. Any substantially quasiperiodic pattern possessing the requisite irrational periodicity and orientational symmetry can be used as the basis for a half-tone dot-pattern which will eliminate Moire' interference patterns when practiced in accordance with the present invention.

Although some embodiments have been described in detail other embodiments employing the spirit of the present invention are also contemplated.

What is claimed is:

1. In a method of printing an image upon an object using a roller comprising the step of converting a continuous tone image into at least one half-tone image having areas to be substantially filled with color and areas to be substantially free from color, the improvement wherein said areas to be substantially filled with color and areas to be substantially free from color are arrayed substantially in accordance with a nearly quasiperiodic pattern comprising a plurality of identifiable elements, wherein the nearly quasiperiodic pattern has a period that is substantially equal to the circumference of the roller.

2. The method of claim 1, further comprising the step of creating a plurality of half-tone images.

3. The method of claim 2, further comprising the step of successively overlaying each of said plurality of half-tone images.

4. An object printed in accordance with the method of claim 1.

5. An object printed in accordance with the method of claim 3.

6. A method of reproducing an image using a roller comprising the step of converting the image to an array of discrete areas substantially filled with color, said discrete areas substantially arrayed in accordance with a quasiperiodic pattern which has an identifiable period, said period being relatively much larger than the discrete areas, whereby said discrete areas substantially exhibit the characteristics of a quasiperiodic pattern over a surface of the roller.

* * * * *